United States Patent
Le et al.

(10) Patent No.: US 12,118,190 B2
(45) Date of Patent: Oct. 15, 2024

(54) METHOD FOR PROCESSING DATA TO ADJUST DATA INPUTTING SPEED IN HUMAN-COMPUTER INTERFACE SYSTEM CONTROLLED BY EYE GAZE AND ELECTROENCEPHALOGRAPHY DATA

(71) Applicants: Ha Thanh Le, Ha Noi (VN); Dang Hai Kieu, Ha Noi (VN); Hoa Minh Nguyen, Ha Noi (VN); Anh Viet Nguyen, Ha Noi (VN); Duyen Thi Ngo, Ha Noi (VN); Hung Ba Nguyen, Ha Noi (VN); Khanh Quoc Man, Bac Ninh (VN)

(72) Inventors: Ha Thanh Le, Ha Noi (VN); Dang Hai Kieu, Ha Noi (VN); Hoa Minh Nguyen, Ha Noi (VN); Anh Viet Nguyen, Ha Noi (VN); Duyen Thi Ngo, Ha Noi (VN); Hung Ba Nguyen, Ha Noi (VN); Khanh Quoc Man, Bac Ninh (VN)

(73) Assignee: UNIVERSITY OF ENGINEERING AND TECHNOLOGY—VIETNAM NATIONAL UNIVERSITY, Ha Noi (VN)

(*) Notice: Subject to any disclaimer, the term of this patent is extended or adjusted under 35 U.S.C. 154(b) by 0 days.

(21) Appl. No.: 18/210,342

(22) Filed: Jun. 15, 2023

(65) Prior Publication Data
US 2023/0325059 A1    Oct. 12, 2023

(51) Int. Cl.
*G06F 3/0484*    (2022.01)
*G06F 3/01*    (2006.01)
(Continued)

(52) U.S. Cl.
CPC ............ *G06F 3/0484* (2013.01); *G06F 3/013* (2013.01); *G06F 3/038* (2013.01); *G06F 3/0482* (2013.01)

(58) Field of Classification Search
CPC ........ G06F 3/0484; G06F 3/013; G06F 3/038; G06F 3/0482; G06F 3/015
See application file for complete search history.

(56) References Cited

U.S. PATENT DOCUMENTS

2011/0091847 A1*    4/2011    Carroll ................... G09B 19/00
                                                                 434/236
2022/0126837 A1*    4/2022    Croxford .............. B60W 50/16

* cited by examiner

*Primary Examiner* — Lixi C Simpson (57) ABSTRACT

The present invention relates to a method for processing data executed by a computing apparatus including at least a storage and a processor in a human-computer interface system using electroencephalography (EEG) data and eye tracking (ET) data, the method comprising following steps: representing through the control interface, a set of list of keys which is associated with user actions; collecting and processing the two EEG and ET dataset, to determine whether the user is looking at a certain key or not and the concentration state of the user while looking at that key, if yes then activating a time counting parameter t with an increasing rate of the time counting parameter $\Delta > 0$ and an adjusting rate $\Delta_T$; confirming whether the user wants to select that key or not, based on a time constraint defined as $t \geq dwell$, wherein dwell is a known parameter according to a conventional method corresponding to a required time duration that the user has to look at a key to select that key. The present invention provides a method for adjusting increase or decrease the time counting parameter t via the adjusting rate $\Delta_T$ which is determined based on the concentration state, to establish an actual time duration in which the user is capable to enter the key faster or slower than the known parameter dwell, adjusting faster or slower according to the (Continued)

concentration state of the user, thus the key inputting using eye gaze becomes more accurate and realistic.

15 Claims, 1 Drawing Sheet

(51) Int. Cl.
    *G06F 3/038*         (2013.01)
    *G06F 3/0482*      (2013.01)

METHOD FOR PROCESSING DATA TO ADJUST DATA INPUTTING SPEED IN HUMAN-COMPUTER INTERFACE SYSTEM CONTROLLED BY EYE GAZE AND ELECTROENCEPHALOGRAPHY DATA

TECHNICAL FIELD

The present invention relates to a method for processing data in a human-computer interface system controlled by eye gaze and electroencephalography data, in particularly, to a method for processing data to adjust data inputting speed of the user when selecting and controlling in the human-computer interface system using a combination of eye tracking (ET) data and electroencephalography (EEG) data. The method is capable of working with EEG data both with few sensors and plurality of sensors. The present invention is further related to a system and a non-transitional computer readable storage medium storing a computer readable program to execute the above mentioned method.

BACKGROUND

As prior knowledge, a conventional computer interface is controlled by a physical mouse and keyboard. In recent years, several new technology products have been introduced supporting provide more options for users in controlling the computer interface. These products often use one or combination of several types of data such as eye tracking data, electroencephalography data, data collected from temperature, electromechanical sensors, etc., to support controlling and selecting elements in the computer interface.

One of the conventional methods using a time parameter corresponding to a required time duration that the user has to look at a key or a button on a virtual keyboard or a control interface to select that key or button, the time parameter is defined as dwell. The parameter dwell allowing the design of the processing and calculating system which is to determine keys or buttons relatively simple and easy. However, how long is the length of the time duration of dwell is still a problem to deal with. If the value is great, users will have to keep their eyes fixed in a certain position for too long causing eye fatigue, whereas if the value is too small, users won't have sufficient time to find the desired keys or buttons causing controlling or data inputting errors.

The patent publication document No. WO 2019167052 A1 introducing a virtual Hindi keyboard system displayed on the screen which relates to several methods for improving data inputting using eyes to supplement or replace for the traditional method, by supplementing the data obtained from a facial electromechanical and some soft small buttons. When the user looks at elements on the computer interface, for example a key on the keyboard, the user may further use another data such as a button to signal a faster selection.

The patent publication document No. US 20070011609 A1 introducing an eye gaze controlled human-computer interface system. The system using a method which creating individual profiles for each user based on features obtained during the user uses eye gaze for controlling the system. The information in the profiles will be used to personalize the interface controlling of the user and reducing some unexpected types of noise of data such as a wink, or a blink.

The patent publication document No. US 20200192478 A1 describes a brain-computer interface (BCI) combined with eye tracking for controlling the user interface on the computer. The system will scan images of the brain state by electrical or optical methods to obtain neural data such as: electroencephalography (EEG), electrocorticography (ECoG) or magnetoencephalography (MEG). The eye tracking data during collecting, data may be partially lost due to reasons such as a wink, or a blink, a very fast movement of the pupil, camera, etc. These BCI and ET data are used for fine turning the eye tracking data and thus increasing the accuracy of the position which the user wants to select.

Based on the frequency range, the EEG signals may be divided into following wave bands:
- alpha wave: is an electromagnetic wave with frequency 8 to 13 Hz and with amplitude 30 to 50 $\mu V$;
- beta wave: is an electromagnetic wave with frequency 14 to 30 Hz and with amplitude 5 to 20 $\mu V$;
- gamma wave: is an electromagnetic wave with frequency 4 to 7 Hz, with amplitude 5 to 20 $\mu V$;
- gamma wave: is an electromagnetic wave with frequency 4 to 7 Hz with amplitude 5 to 20 $\mu V$;
- gamma wave: is an electromagnetic wave with frequency 4 to 7 Hz, with amplitude less than 30 $\mu V$; and
- delta wave: is an electromagnetic wave 0.5 to 3 Hz and with amplitude 100 to 200 $\mu V$.

Obviously, the EEG data reflects brain activity associated with specific actions of the user, such as the act of focusing or directing the eye gaze on elements in the computer interface to select or control, these EEG data may complement well to a controlling method using ET data to increase controlling accuracy. However, different EEG data monitoring devices having different number of sensors may provide the different EEG dataset with the number of different data channels. If the number of data channels is small will cause machine learning methods being less effective. In vice versa, datasets with the number of plurality of channels will require monitoring devices with higher cost and complicated usage. Thus, there is a need of technical solutions which well exploit the features of the EEG data, not to complicated, and may significantly enhancing the accuracy and convenience for users.

SUMMARY

An object of the present invention is to provide a method for processing data in a human-computer interface system controlled by eye gaze and electroencephalography data, may overcome one or more above mentioned problems.

Another object of the present invention is to provide a method for processing data in human-computer interface system using ET and EEG data to make the selecting and controlling keys on the user interface by eye gaze better, and may significantly enhancing the accuracy and convenience for users.

Yet another object of the present invention is to provide a system and a non-transitional computer readable storage medium storing a computer readable program to execute the above mentioned method.

Various objects to be achieved by the present invention are not limited to the aforementioned objects, and those skilled in the art to which the disclosure pertains may clearly understand other objects from the following descriptions.

To achieve one or more above objects, according to an aspect, the present invention provides a method for processing data executed by a computing apparatus with at least a storage and a processor in an eye gaze controlled human-computer interface system using electroencephalography (EEG) data and eye tracking (ET) data,
wherein the human-computer interface system includes at least a screen configured to display a control interface for user via a list of keys which is associated with user actions, an electroencephalography monitoring device for collecting the electroencephalography data, and an eye tracking device for collecting the eye tracking data, the method comprising following steps:

representing through the control interface, at least one or more sets of the list of keys which is associated with user actions in a specific context;

collecting and preprocessing an ET dataset while the user is looking at the control interface to determine the eye tracking data which is data of coordinate form (x,y) corresponding to the position on the screen that the user's eyes look at;

defining the key that the user wants to select based on the (x,y) coordinates on the screen that the user's eyes be looking at by calculating whether said (x,y) coordinates is within the boundary of a certain key or not;

if the (x,y) coordinates is within the boundary of the key then setting up and calculating a time counting parameter t to confirm whether the user is trying to select said key or not, based on at least a time constraint defined as t≥dwell, wherein dwell is a known parameter corresponding to a required time duration that the user has to look at a key to select that key, and when the time constraint is satisfied then confirming that the user wants to select that key, said setting up and calculating the time counting parameter t are executed as following:

setting up a time counting parameter t=0, an increasing rate of the time counting parameter Δ>0, and an adjusting rate $\Delta_T$=0, performing a loop cycle including:

updating the time counting parameter t according to the formula:

$$t := t + \Delta + \Delta_T,$$

checking the time constraint t≥dwell, and updating the adjusting rate $\Delta_T$ based on the EEG data, wherein said updating the adjusting rate $\Delta_T$ is carried out as follow:

collecting the EEG data within about n seconds right before the time t of the current loop that is the time duration from t−n to t;

preprocessing the obtained EEG data;

extracting features of the preprocessed EEG dataset;

inputting the extracted features from the EEG data into the classifier M to determine a concentration state p and a confidence score $conf_p$; and setting up the increasing rate of the time counting parameter $\Delta_T$ based on the concentration state p and the confidence score $conf_p$.

The list of keys are keys, buttons, control keys, characters, tags, icons, or a combination thereof.

Preferably, the receiving time of the EEG data since the user starts looking at a key that the user wants to "press" n selected within about 0.1 to 0.45 seconds.

In a practical use, dwell may be selected within about 0.3 to 3 seconds.

Preferably, the increasing rate of the time counting parameter is determined by the formula Δ=1/nc giây, wherein nc is the number of cycles that the system executes in one second and nc selected within about 100 to 2000.

Optionally, extracting the features of the EEG dataset is extracting the CSP (Common Spatial Pattern) features if the EEG data received from the electroencephalography monitoring device with the number of channels less than the predetermined number of channels c or extracting the PSD (Power Spectral Density) features in vice versa, wherein c selected within about 14 to 64.

The classifier M using a support vector machine model, a multilayer perceptron model, or a same classification model.

In an embodiment, wherein the adjusting rate $\Delta_T$ is updated according to the formula:

$$\Delta_T = \begin{cases} (p * conf_p * \beta_p)/nc & \text{if } conf_p \geq \theta \\ 0 & \text{in vive versa} \end{cases},$$

wherein p is a label indicating the concentration state (p=−1 means not concentration and p=+1 means concentration) and $conf_p \in [0,1]$ is the confidence score of the label (the greater $conf_p$ the more confident the label p), p and $conf_p$ are returned from the classifier M, and $\beta_p$ is a user experience coefficient.

The user experience coefficients $\beta_p$ may be selected within about 0 to 3 and 9 selected within about 0.5 to 0.8.

Optionally, the electroencephalography monitoring device (EEG) is a wearable headset or a cap which includes plurality of sensors in form of contact electrodes on the user's head.

The eye tracking device is a fixed device embedded in the screen, a device connected or attached on the screen of an electronic apparatus, or a device which is wearable by the user preferred as a glasses.

Preferably, the eye tracking device comprising an infrared camera.

According to another aspect, the present invention is to provide a method for processing data executed by computing apparatus including at least a storage and a processor in an eye gaze controlled human-computer interface system using electroencephalography (EEG) data and eye tracking (ET) data, wherein the human-computer interface system includes at least a screen configured to display a control interface for user via a list of keys which is associated with user actions, an electroencephalography monitoring device for collecting the electroencephalography data, and an eye tracking device for collecting the eye tracking data, the method comprising following steps:

representing through the control interface, at least one or more sets of the list of keys which is associated with user actions in a specific context;

collecting and preprocessing an ET dataset while the user is looking at the control interface to determine the eye tracking data which is data of coordinate form (x,y) corresponding to the position on the screen that the user's eyes look at;

defining the key that the user wants to select based on the (x,y) coordinates on the screen that the user's eyes be looking at by calculating whether said (x,y) coordinates is within the boundary of a certain key or not;

if the (x,y) coordinates is within the boundary of the key then setting up and calculating a time counting parameter t to confirm whether the user is trying to select said key or not, based on at least a time constraint defined as t≥dwell, wherein dwell is a known parameter corresponding to a required time duration that the user has to look at a key to select that key, and when the time constraint is satisfied then confirming that the user wants to select that key, said setting up and calculating the time counting parameter t are executed as following:
  setting up a time counting parameter t=0, an increasing rate of the time counting parameter Δ>0, an adjusting rate $\Delta_T$=0,
  performing a loop cycle including:
    updating the time counting parameter t according to the formula:

$t:=(t+\Delta+\Delta_T)*\beta_{cus}$, wherein $\beta_{cus}$ is a competent using skill coefficient which is determined to be proportional to the level of the competent using skill of user,
      checking the time constraint t≥dwell, and
      updating the adjusting rate $\Delta_T$ based on the EEG data,
      wherein said updating the adjusting rate $\Delta_T$ is carried out as follow:
        collecting the EEG data within about n seconds right before the time t of the current loop that is the time duration from t−n to t;
        preprocessing the obtained EEG data;
        extracting features of the preprocessed EEG dataset;
        inputting the extracted features from the EEG data into the classifier M to determine a concentration state p and a confidence score $conf_p$; and
  setting up the increasing rate of the time counting parameter $\Delta_T$ based on the concentration state p and the confidence score $conf_p$.

The competent using skill coefficient $\beta_{cus}$ having the default value is 1.

The competent using skill coefficient $\beta_{cus}$ adjusted to increase as the level of the competent using skill of the user increases.

DESCRIPTION OF EMBODIMENTS

The invention will be more fully described by reference to the accompanying drawings. The exemplarily embodiments are provided for the present invention is to be clear and fully describe the scope of the present invention for those skilled in the art. Specific elements are provided, such as specific portions, devices and methods, to support clear understanding of the embodiments according to the present invention. For those skilled in the art it will be clear that there is no need to use specific elements, but exemplarily embodiments may be expressed in many different forms and the specific elements and methods shall not be construed to limit the scope of the disclosure of the invention.

Firstly, as for the data inputting or controlling by eye gaze in the human-computer interface system, the process by which users use their eyes to select a certain input key or control key may be divided into two main phases: a searching phase and a pending input phase. To select a key on the screen, users need to move a pointer on that key and keeping the pointer inside the key until the time duration that the user continuously looks at the key greater than or equal to the value of dwell. Herein, dwell is referred as pending input time and at this time the input or control key is defined as within the pending input time. If the pointer moves out of the key (or the user direct eye gaze out of the key area) prior to the timeout of the pending input time then said key won't be selected. For example, when the user wants to select the key B, the user must direct eye gaze to look at that key so that the pointer on the screen moving inside the key B, and keep the eye gaze continuously looks at the key B to keep the pointer inside the key B and not to move out of the key B, until the time duration in which the pointer is inside the key B reached to the value of dwell then the system confirms that the user wants to select the key B. In general, if the time duration in which the pointer inside the key B not to reach the value of dwell but the user direct the eye gaze to a different place then the inputting is fail and the process backs to the beginning if the user still want to continue to select the key B. Obviously, for each different user the value of dwell may be adjusted to be suitable to each specific user. However, when the value of dwell is set for the user, may normally not change, and therefore may not be optimal for different uses, or different user states, such as the user being in concentration state or not being in concentration state.

It is obviously that, the level of concentration of the user while the user looks at a key to select, for example the key B, is related to the accuracy of "intent" selecting the key B of the user. When the user looks to select the key B with a high level of concentration, the system may no need to wait for a time duration equal to the value of dwell to confirm that the user wants to select the key B. In vice versa, when the user looks at the key B with a low level of concentration or de concentration, the system may need to wait for a time duration greater than the value of dwell to confirm that the user wants to select the key B. The level of concentration of the user may be determined by analyzing the EEG data.

Therefore, the present invention aims to adjust the value of dwell is set up or prior known corresponding to a required time duration that the user has to look at a key to select that key by using a combination of two types of data ET and EEG.

The human-computer interface system according to the present invention (hereafter may be referred as the system) comprising a computing device, a displaying screen, an ET data capturing device, an EEG data monitoring device. The EEG data monitoring device may be a wearable headset or a cap which includes plurality of sensors in form of contact electrodes on the user's head. The ET data capturing device may be fixed (embedded in the screen), movable (connected or attached on various screens of electronic apparatuses) or wearable (embedded in a glasses). According to another embodiment, the ET data capturing device may include an infrared camera.

According to different embodiments of the present invention, the EEG data monitoring device may be with a few channels or plurality of channels.

According to an embodiment, the ET data capturing device may be used to determine the position where user's eyes wants to seek, or in another sense, the ET data capturing device may use the movement trajectory of the human eye as features for controlling the pointer, detecting important information in behavior and intention of the user. The defining the key that the user wants to select based on ET eye movement data coordinates by considering the (x,y) coordinates location that the user's eye is looking on the screen, comparing with the coordinates of the boundary of the key, if said (x,y) coordinates is within the boundary of the key the system will confirm that the user want to select that key.

The user stand/sit/lie down in front of the screen of the system, with a predetermined distance, for example at least 60 cm and maximum 1 m. The screen displaying user interface and keys. The user using eye gaze to select keys or input text contents. To select a key or a character/word on the screen, the user seeks that key or character/word by eye. The screen displays an inputting pointer in form of a small ring at location where the user is looking on the screen. When seeking the key or character/word which the user wants to choose, the user looks in a concentrated way on the target to fix the inputting pointer position at the target.

According to one or several embodiments of the present invention, the screen displays the user interface may not work continuously to save energy. The activating the screen to display the user interface may be carried out via recognizing or determining each time the user wants to select keys or input text contents to convey a content, intent, or a certain control command via directing eye gaze to a corresponding key.

For example, when the user is in a non-wearing state of the electroencephalography monitoring device and switch to a wearing state of the electroencephalography monitoring device the human-computer interface system according to the present invention will activate the screen to display the user interface to be ready for the user to select keys or input text contents.

Other alternative examples using any event, data or information which indicating that the user is expecting to select keys or input text contents on the screen which displays the user interface, may be used to activate the screen to display the user interface, for example capturing image and analyzing poses/postures of the user, may also be used.

Preferably, the user interface is displayed suitable to the pose/posture of the user, for example when the user is in a lying, sitting, or standing pose, the user interface may be selected among different interfaces to facilitate the user observing and inputting data by eye gaze. Determining the user's posture may be carried out by capturing images and and analyzing postures of the user. However, the present invention is not limited thereto.

According to different embodiments of the present invention, the level of concentration while the user is looking at a key to select that key may be reflected by a time parameter, referred as an adjusting rate $\Delta_T$, how it works will be described in more detail hereafter.

While the inputting pointer is within the boundary of the key (a button, a key, a control key, a word/character, tag, icon) the system will initialize a time counting parameter t=0 and update t after each loop with a increasing rate of the time counting parameter $\Delta$ (or increasing rate $\Delta$ in short) and an adjusting rate $\Delta_T$. This process is called the input pending state. Whenever the value of t is greater or equal to dwell, the system determines that the user expect to select the key or the word/character at the position of the inputting pointer. If the user moves his or her eyes to another location outside of the pending key/word/character is to select, the time counting parameter t will be set to zero. The system cancels the input pending state of the key when the value of the time counting parameter is zero.

In general, the increasing rate $\Delta$ has a positive value reflecting the actual time duration in which the inputting pointer is within the boundary of the key, and the adjusting rate $\Delta_T$ reflecting the adjusting time duration which is based on the level of concentration of the user. For example, if the user is not in concentration then $\Delta_T$ may be negative, the time counting parameter t will be increased slower than the actual time, this means it takes longer than usual to determine that the user expect to select the key at the position of the inputting pointer. In contrary, if the user is in concentration then $\Delta_T$ may be positive, the time counting parameter t will be increased faster than the actual time, this means it takes shorter than usual to determine that the user expect to select the key at the position of the inputting pointer.

According to an embodiment, updating t after each loop is executed according to the formula t:=t+$\Delta$+$\Delta_T$.

It is easy to see from the above formula that, if it is without the presence of the adjusting rate $\Delta_T$, or by a specific reason the adjusting rate $\Delta_T$=0 (for example, the user not wearing the electroencephalography monitoring device), then after completing all loops, the value of the time counting parameter t is exactly equal to the actual time duration by which the inputting pointer is within the boundary of the key, this means that if t=dwell then the actual time duration in which the inputting pointer is within the boundary of the key is also equal to dwell. When the adjusting rate $\Delta_T$ is present and calculated based on the EEG data to reflect the level of the concentration of the user, then the value of the time counting parameter t is substantially different (greater or less than) the actual time duration in which the inputting pointer is within the boundary of the key, this means that if t=dwell then the actual time duration in which the inputting pointer is within the boundary of the key less than dwell (for example, when the user is in concentration, $\Delta_T$>0) or greater than dwell (for example, when the user is not in concentration, $\Delta_T$<0), ensuring more accurate confirmation of the key that the user expect to input according to the concentration state of the user while the user is looking at that key.

In an actual use, users do not always need to wear the electroencephalography monitoring device to carried out the key inputting according to the present invention. In particular, when the user is not wearing the electroencephalography monitoring device, the adjusting rate $\Delta_T$ is determined as equal to zero, and the user can still input keys, because that after several loops the increasing rate $\Delta$ having a positive value still guarantee the value of t greater than or equal to dwell.

This is especially beneficial, for example in case of the user needs a support to wear the electroencephalography monitoring device, but there is not always a support person nearby, said user may input a command by eye gaze, for example asking for a support or call for an attendant/supporter, without wearing the electroencephalography monitoring device. When there is someone to help, said user may be support to wear the electroencephalography monitoring device to input the keys or text contents.

According to an embodiment, updating t after each loop is executed according to the formula t:=(t+$\Delta$+$\Delta_T$)*$\beta_{cus}$, wherein $\beta_{cus}$ is a competent using skill coefficient which is determined to be proportional to the level of the competent using skill of user.

When the user is new to have acquaintance or in the first time using the human-computer interface system controlled by eye gaze and electroencephalography data according to the present invention, most users may not be familiar with it or not be competent with using eye gaze for controlling, not be familiar or competent with list of keys which is associated with user actions in a specific context which is displayed by the user inter face, or the same. However, after a period time of usage the level of the competent using skill of the user will be increased, then at that time the level of concentration and eye interaction of the user supposed to be better too. This allows an adjustment of the pending input time, for example it is decreased when the level of concentration increased (because of the level of the competent using skill increased). So that, the competent using skill coefficient $\beta_{cus}$ is adjusted to increase as the level of the competent using skill of the user increased, to make the time counting parameter t adjusted to be increased faster.

Preferably, the competent using skill coefficient $\beta_{cus}$ having the default value is 1. When the user or the supporter not to carry out an adjustment of the competent using skill coefficient $\beta_{cus}$ it is substantially not affect the operation of the human-computer interface system controlled by eye gaze and electroencephalography data according to the present invention. According to an exemplarily embodiment, the increasing rate Δ continuously updated is the interval between two consecutive loop. In typically, this value is set to 1/nc seconds, wherein nc is the number of iterations performed by the system in one second. This parameter make the variable of the time counting parameter t is linearly increased by the real-time clock.

The adjusting rate $\Delta_T$ is changed depending on the level of concentration or not concentration of the user based on the EEG data. While waiting for inputting, if the user is in high level of concentration state, $\Delta_T$ has a positive value to speed up the time counting parameter t, in contrary, if the user is not in concentration state, $\Delta_T$ has a negative value to decrease the time counting parameter t. Preferably, the concentration state is determined by analyzing the EEG data obtained from the electroencephalography monitoring device which is wore by the user during the user controlling or inputting keys or text contents, applying machine learning models which is commonly used in the prior art.

Figure 1:
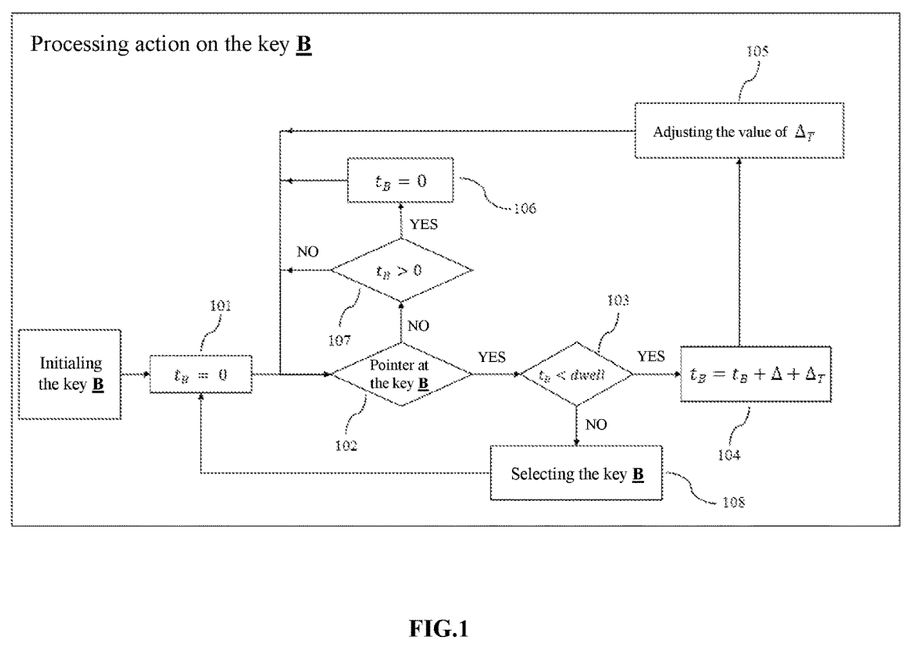
FIG. 1 is a flowchart illustrating the steps to be executed to determine whenever the user expects to select, control a key.

FIG. 1 illustrates a method for processing data in a human-computer interface system controlled by eye gaze and electroencephalography data according to an embodiment of the present invention, to determine whenever the user expect to select a certain key, for example a control key B (may be called as the key B for short). Each control key B having a time counting parameter $t_B$ indicated a time duration in which the user has been looking at that key but with an adjustment in comparison to the actual time. At the beginning, the time counting parameter $t_B$ is set to zero (step 101). When the user expects to select the key B, the user must direct his or her eyes to look at that key so as the pointer on the screen moving inside the area of the key B (step 102). At this time, the system will determine (x,y) coordinates of the ET signal within the area of the key B by comparing (x,y) with the coordinates of the boundary of the key B. Following at the step 103, the system will check the value of $t_B$ whether it is less than dwell or not (dwell is a required time duration that the user has to look at a key to select that key), if YES, the value of $t_B$ will be updated after each loop according to the formula $t_B=t_B+\Delta+\Delta_T$ (Δ is commonly set up so that the variable of $t_B$ is linearly increased by the real-time clock and $\Delta_T$ is set to zero at the beginning) at the step 104. After that the system adjust the value of $\Delta_T$ (step 105) and repeat to the step of checking whether the user is looking at the key B or not (step 102). During this process, if the user looks out of the key B, the value of $t_B$ will set to zero (step 106, step 107). When the user looks at the key B, the value of $t_B$ will continue to increase and until said value is not less than dwell the system will confirm that the user expects to select the key B (step 108).

Figure 2:
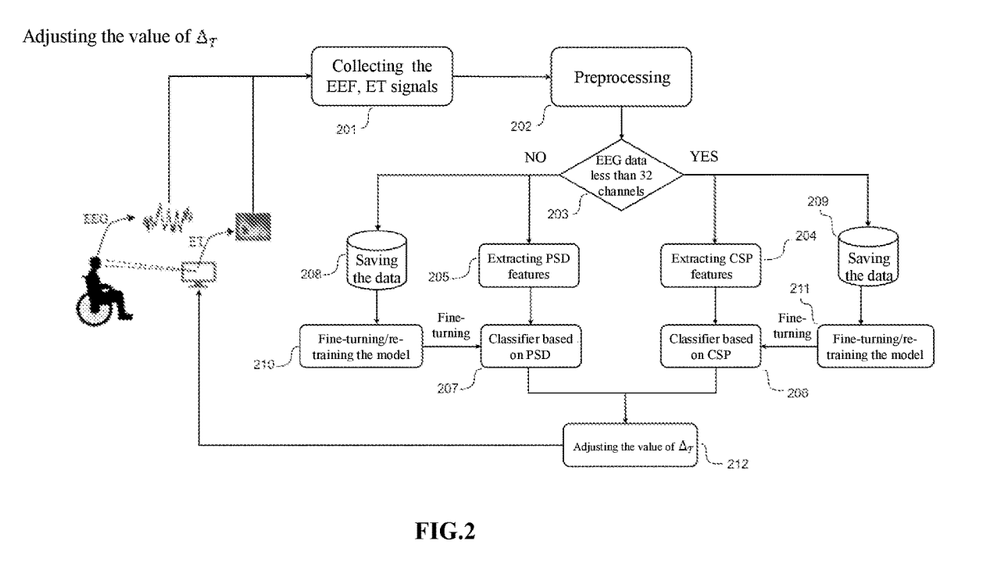
FIG. 2 is a flowchart illustrating the steps to be executed to decrease the pending input time provided by a method according to the present invention.

FIG. 2 illustrates the details of the steps for implementing a method provided to adjust the value of $\Delta_T$ at the step 105 in FIG. 1, thereby adjusting the time the user waits for input. The method according to the present invention includes the steps from the step 201 to the step 212 as described in details hereafter.

Step 201: Collecting

The system collecting the EEG and ET data. Wherein, the EEG data is data in time series, collected from the plurality of signal channels of the electroencephalography monitoring device. Each signal channel is taken from a source as the output of a corresponding electrode of the electroencephalography monitoring device, measured by voltage potential difference between said electrode and a reference electrode with a specific sampling frequency (for example 128 Hz). The ET data is a location of the pointer on the screen and indicated by 2 values which represent the pointer's coordinates on the two-coordinates system associated with the screen. The sampling frequency of the ET data is also defined (for example 64 Hz).

Step 202: Preprocessing the Data

Normalizing the value of the EEG data within a ranges of value [0,1] and band-pass filter within the range [a,b]. Wherein, normalizing is for making the range values of data signal converted into the range of [0,1] by applying a method that subtracting the smallest value, then dividing to the greatest value of the dataset, as for each of data value. Using the band-pass filter is to remove frequency components which are out of the range from a to b, is typically noise components, with the value a equal to zero Hz and b is within a range from 30 to 50 Hz due to the quality of the obtained data.

Processing the ET signal, wherein (x,y) coordinates of the ET data will be compared to coordinates of the boundary of a pending selected key by the system, to determine whether that key is to input to ensure the signal processing is within the area of the selected key.

Step 203: Checking the Number of Channels of the EEG Data

Checking the number of the channels of the EEG data to obtain the number of the channels of the electroencephalography monitoring device which being wore by the user.

Step 204, and Step 205: Calculating the Features

Calculating features is a process of transforming data from the original spatial domain into a new spatial domain in which the data having features facilitating for the problem under consideration. Herein, it is the classification task in particular. Based on the number of the channels of the EEG data, the data obtained via the step of preprocessing will be given to a compatible calculating of the features. If the EEG data having the number of the channels less than c (c=32, determined experimentally) then the two data types will be given to the subsystem CSP (step 204). If the EEG data having the number of the channels greater than or equal to c then the two data types will be given to the subsystem PSD (step 203). The detailed descriptions of the two subsystem will be provided as following.

The Subsystem CSP (Common Spatial Pattern)

After to be trained, shall transform the data into the data with CSP features, having a high discrimination between 2 cases pending for inputting or seeking for a target (step 204). The main idea of CSP is to use a linear transformation for mapping the multi-channel EEG data to a spatial domain with a lower dimensionality by a matrix, wherein each row of the matrix is the weights for a channel. This transformation is to increase the discriminability of the data by maximizing the variance of the data at a class, as well as minimizing the data variance in another class. The CSP method is based on simultaneously cross-over the covariance matrices of both classes.

The CSP approach may be described as following, with an example about data classification of a character-concentrated looking activity for pending input and the data of a quick-scan looking activity for seeking a character:

Given $X_f$ and $X_s$ are matrices of the EEG data for 2 classes respectively: the data class representing the concentrated looking and the data class representing the quick-scan looking for seeking the character. The dimensions of the two matrices is N×M where N is the number of the channels and M is the number of data samples of one class. A normalized covariance matrix may be defined as:

$$\left[ C_f = \frac{X_f X_f^T}{tr(X_f X_f^T)} \quad C_S = \frac{X_s X_s^T}{tr(X_s X_s^T)} \right],$$

wherein tr is a trace function of the matrix, is the sum of the elements on the diagonal of the matrix. After having the normalized covariance matrices $C_f$ and $C_s$, the classification target of the CSP may achieve by finding a weights matrix W so that the value of $tr(W^T C_f W)$ is maximized with the constraint of $W^T(C_f+C_s)W=I$, where I is an identity matrix and $W^T$ is a transpose matrix of W.

The data after passing through the subsystem CSP will be saved as a matrix with the dimensions of N×M. Where N is the number of the channels and M is the number of the data samples of one class. CSP supports to find a common spatial component between the two EEG data class, helps enhancing the distinction between them and improving the classification ability.

The Subsystem PSD (Power Spectral Density)

Extracting the PSD features (step 205). In this subsystem, the data is divided into segments with the size of m data frames, wherein each data frame is interpreted as a block of data obtained at a same time. Each data segment will be passed through the Fourier transformation, after calculating the PSD value according to each frequency band corresponding to the wave signals of alpha, beta, gamma, and delta, according to the following formula:

$$P(m) = \frac{F(m)F^*(m)}{f_s}$$

where:

P(m) is the PSD value of the data corresponding to frequency n,

F(m) is the result of the Fourier transformation for the EEG data,

F*(m) is the conjugate function of F(m), $f_s$ is the sampling frequency of the data.

In the formula of P(m), F*(m) is the conjugate function of F(m) means that F*(m) having the reality part is the same with that of F(m) and the imaginary part is in symmetry to that of F(m) by the reality axis. The multiplication F(m)F*(m) obtaining a non-negative reality number, indicating the energy of the EEG signal at the data frame m.

Step 206, 207: Distinguish the Pending Input State and the Seeking State

The CSP or PSD features obtained at the step 203 is passed into separate classifiers which are prior trained (step 206 or step 207). The classifiers using a support vector machine (SVM) or Multi-Layer Perceptron (MLP). The two models are integrated in most commonly machine learning support libraries for example the libraries of the Scikit-learn. The selection of the kernel for the model SVM may be based on the knowledge and characteristics of the EEG data obtained. If necessary, a repeat procedure may be executed to compare the outputs to see which kernel matches with the actual dataset. The number of hidden layers as well as initial parameters for the model MLP are adjusted based on the characteristics of the obtained data by repeating the classification process many times until achieving the desired result.

The result of the classifier is a value $p \in \{-1,+1\}$ representing the result of the pending input state is in concentration with p=+1 or not concentration with p=-1 and a confidence score $conf_p \in [0,1]$ respectively. The greater the value of $conf_p$ the higher the confidence score of the label p.

Step 212: Adjusting the Value of $\Delta_T$ Based on Values Associated to the Pending Input State and the Confidence Score of the Pending Input State Obtained from the Classifier According to the Following Formula:

$$\Delta_T = \begin{cases} (p * conf_p * \beta_p)/nc & \text{if } conf_p \geq \theta \\ 0 & \text{in vive versa} \end{cases},$$

wherein, p and $conf_p$ are the concentration state label and the confidence score of the returned label of the classifier M and $\beta_p$ is an user experience coefficient and $\beta_p \in [0,3]$ and $\theta \in [0.5,0.8]$ is a coefficient determined based on the experience of the user. Herein, if the pending input state of the user is in concentration, corresponding to p=+1, the value of the adjusting rate $\Delta_T>0$ helps increasing the key inputting. The higher the confidence score $conf_p$ the faster the adjusting rate. In contrary, if the pending input state is not in concentration, corresponding to p=-1, the value of the adjusting rate $\Delta_T<0$ helps decreasing the key inputting. Experiments show that, the experience of the user about the increasing and decreasing process based on the concentration is different. Therefore the coefficients $\beta_p$ and $\theta$ are used to customized based on demand of the user.

Step 210, 211: Fine Turning, Re-Training the Model with the New Dataset.

Optionally, during using the system, data will be continuously saved due to the number of the channels of the EEG data (step 208 and step 209) used for the fine turning, re-training the model. After the data is collected in a certain period of time, data may be verified with the level of accuracy and labeled, the system may re-calculate corresponding features (CSP or PSD) which are used as well as re-train the selected classification model. The training process is carried out on a separate progress and run parallel to a main process of the system (step 210 and step 211), and may be monitored to adjust the parameters of the model.

After the re-training process at the steps 210 and 211 are completed, the main process reloads the parameters of the model and continue to run.

According to an embodiment, the above mentioned algorithms may be implemented by computing devices, such as a computer, which include a processor and a storage. The term "processor" must be interpreted in a broad sense including a general-purpose processor, a central processing unit (CPU), a microprocessor, a digital signal processor (DSP), a controller, a microcontroller, a state machine, and similar processors. In some cases, a "processor" may be used to refer to an application-specific integrated circuit (ASIC), a programmable logic device (PLD), a field programmable gate array (FPGA), and similar devices. The term "processor" may be used to refer the combination form of processors, for example, the combination form of a DSP and a processor, the combination form of the plurality of processor, the combination form of one or more processors combined with a DSP core, or the combination form of different configurations. The term "storage" must be interpreted in a broad sense including any electronic component capable of storing electronic information. The term "storage" may be used to refer different types of media readable by a processor, such as a random access memory (RAM), a read-only memory (ROM), a non-volatile random access memory (NVRAM), a programmable read-only memory (PROM), an erase-programmable read-only memory (EPROM), an electrically erasable programmable read-only memory (EEPROM), a flash memory, a magnetic or an optical data storage device, register, and similar memories. When the processor is capable of reading information from and/or writing information to memory, then the memory can be said to be communicating electronically with the processor. The memory embedded into the processor is in a state of electronically communication with the processor.

The above described embodiments of the present invention may be recorded as a program capable to be implemented by a computer and by a general purpose digital computer which operates this program through a computer readable storage medium. The computer readable storage medium may include a storage medium such as a magnetic storage medium (for example, ROM, a floppy disk, a hard disk, etc.) and an optical storage medium (for example, CD-ROM, DVD, etc.).

Various embodiments have been described above. It will be apparent to those of ordinary skill in the art that the present invention may be implemented in various different forms without departing from the spirit and scope of the invention. Therefore, the above embodiments of the present invention must be considered in a descriptive sense and not for the purpose of limiting the invention. The scope of the present invention is defined as the appended claims rather than in the above mentioned description, and all distinct parts falling within equivalence shall be construed to remain within the scope of the invention.

What is claimed is:

1. A method for processing data executed by a computing apparatus with at least a storage and a processor in an eye gaze controlled human-computer interface system using electroencephalography (EEG) data and eye tracking (ET) data,
    wherein the human-computer interface system includes at least a screen configured to display a control interface for user via a list of keys which is associated with user actions, an electroencephalography monitoring device for collecting the electroencephalography data, and an eye tracking device for collecting the eye tracking data, the method comprising following steps:
    representing through the control interface, at least one or more sets of the list of keys which is associated with user actions in a specific context;
    collecting and preprocessing an ET dataset while the user is looking at the control interface to determine the eye tracking data which is data of coordinate form (x,y) corresponding to the position on the screen that the user's eyes look at;
    defining the key that the user wants to select based on the (x,y) coordinates on the screen that the user's eyes be looking at by calculating whether said (x,y) coordinates is within the boundary of a certain key or not;
    setting up and calculating a time counting parameter t, during the (x,y) coordinates is within the boundary of the key defined in the foregoing step, to confirm whether the user is trying to select said key or not, based on at least a time constraint defined as t≥dwell,
    wherein dwell is a known parameter corresponding to a required time duration that the user has to look at a key to select that key, and when the time constraint is satisfied then confirming that the user wants to select that key,
    said setting up and calculating the time counting parameter t are executed as following:
        setting up a time counting parameter t=0, an increasing rate of the time counting parameter Δ>0, and an adjusting rate $\Delta_T=0$,
        performing a loop cycle including:
            updating the time counting parameter t according to the formula:
            $t:=t+\Delta+\Delta_T$,
            checking the time constraint t≥dwell, and
            updating the adjusting rate $\Delta_T$ based on the EEG data,
            wherein said updating the adjusting rate $\Delta_T$ is carried out as follow:
                collecting the EEG data within about n seconds right before the time t of the current loop that is the time duration from t−n to t;
                preprocessing the obtained EEG data;
                extracting features of the preprocessed EEG dataset;
                inputting the extracted features from the EEG data into the classifier M to determine a concentration state p and a confidence score $conf_p$; and
            setting up the increasing rate of the time counting parameter $\Delta_T$ based on the concentration state p and the confidence score $conf_p$.

2. The method according to claim 1, wherein the list of keys are keys, buttons, control keys, characters, tags, icons, or a combination thereof.

3. The method according to claim 1, wherein the receiving time of the EEG data since the user starts looking at a key that the user wants to "press" n selected within about 0.1 to 0.45 seconds.

4. The method according to claim 1, wherein dwell selected within about 0.3 to 3 seconds.

5. The method according to claim 1, wherein the increasing rate of the time counting parameter is determined by the formula Δ=1/nc seconds, wherein nc is the number of cycles that the system executes in one second and nc selected within about 100 to 2000.

6. The method according to claim 1, wherein extracting the features of the EEG dataset is extracting the CSP (Common Spatial Pattern) features sif the EEG data received from the electroencephalography monitoring device with the number of channels less than the predetermined number of channels c or extracting the PSD (Power Spectral Density) features in vice versa, wherein c selected within about 14 to 64.

7. The method according to claim 1, wherein the classifier M using a support vector machine model, a multilayer perceptron model, or a same classification model.

8. The method according to claim 7, wherein the user experience coefficients $\beta_p$ selected within about 0 to 3 and θ selected within about 0.5 to 0.8.

9. The method according to claim 1, wherein the adjusting rate $\Delta_T$ is updated according to the formula:

$$\Delta_T = \begin{cases} (p*conf_p*\beta_p)/nc & \text{if } conf_p \geq \theta \\ 0 & \text{in vive versa} \end{cases},$$

wherein p is a label indicating the concentration state (p=−1 means not concentration and p=+1 means concentration) and $conf_p \in [0,1]$ is the confidence score of the label (the greater $conf_p$ the more confident the label p), p and $conf_p$ are returned from the classifier M, and $\beta_p$ is a user experience coefficient.

10. The method according to claim 1, wherein the electroencephalography monitoring device (EEG) is a wearable headset or a cap which includes plurality of sensors in form of contact electrodes on the user's head.

11. The method according to claim 1, wherein the eye tracking device is a fixed device embedded in the screen, a device connected or attached on the screen of an electronic apparatus, or a device which is wearable by the user preferred as a glasses.

12. The method according to claim 1, wherein the eye tracking device comprising an infrared camera.

13. A method for processing data executed by computing apparatus including at least a storage and a processor in an eye gaze controlled human-computer interface system using electroencephalography (EEG) data and eye tracking (ET) data, wherein the human-computer interface system includes at least a screen configured to display a control interface for user via a list of keys which is associated with user actions, an electroencephalography monitoring device for collecting the electroencephalography data, and an eye tracking device for collecting the eye tracking data, the method comprising following steps:

representing through the control interface, at least one or more sets of the list of keys which is associated with user actions in a specific context;

collecting and preprocessing an ET dataset while the user is looking at the control interface to determine the eye tracking data which is data of coordinate form (x,y) corresponding to the position on the screen that the user's eyes look at;

defining the key that the user wants to select based on the (x,y) coordinates on the screen that the user's eyes be looking at by calculating whether said (x,y) coordinates is within the boundary of a certain key or not;

setting up and calculating a time counting parameter t, during the (x,y) coordinates be within the boundary of the key defined in the foregoing step, to confirm whether the user is trying to select said key or not, based on at least a time constraint defined as t≥dwell, wherein dwell is a known parameter corresponding to a required time duration that the user has to look at a key to select that key, and when the time constraint is satisfied then confirming that the user wants to select that key, said setting up and calculating the time counting parameter t are executed as following:

setting up a time counting parameter t=0, an increasing rate of the time counting parameter Δ>0, an adjusting rate $\Delta_T$=0, performing a loop cycle including:

updating the time counting parameter t according to the formula:

$t:=(t+\Delta+\Delta_T)*\beta_{cus}$, wherein $\beta_{cus}$ is a competent using skill coefficient which is determined to be proportional to the level of the competent using skill of user, checking the time constraint t≥dwell, and updating the adjusting rate $\Delta_T$ based on the EEG data, wherein said updating the adjusting rate $\Delta_T$ is carried out as follow:

collecting the EEG data within about n seconds right before the time t of the current loop that is the time duration from t−n to t;

preprocessing the obtained EEG data;

extracting features of the preprocessed EEG dataset;

inputting the extracted features from the EEG data into the classifier M to determine a concentration state p and a confidence score $conf_p$; and setting up the increasing rate of the time counting parameter $\Delta_T$ based on the concentration state p and the confidence score $conf_p$.

14. The method according to claim 13, wherein the competent using skill coefficient $\beta_{cus}$ having the default value is 1.

15. The method according to claim 13, wherein the competent using skill coefficient $\beta_{cus}$ adjusted to increase as the level of the competent using skill of the user increases.

* * * * *